(12) United States Patent
Collins et al.

(10) Patent No.: US 6,524,987 B1
(45) Date of Patent: Feb. 25, 2003

(54) ORGANOMETAL CATALYST COMPOSITIONS

(75) Inventors: Kathy S. Collins, Bartlesville, OK (US); Syriac J. Palackal, Bartlesville, OK (US); Max P. McDaniel, Bartlesville, OK (US); Michael D. Jensen, Bartlesville, OK (US); Gil R. Hawley, Dewey, OK (US); Kenneth R. Farmer, Dewey, OK (US); Christopher E. Wittner, Bartlesville, OK (US); Elizabeth A. Benham, Bartlesville, OK (US); Anthony P. Eaton, Dewey, OK (US); Joel L. Martin, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/470,514

(22) Filed: Dec. 22, 1999

(51) Int. Cl.$^7$ ............... B01J 31/00; B01J 37/00; C08F 4/02; C08F 4/60; C08F 4/06
(52) U.S. Cl. .............. 502/128; 502/119; 502/129; 526/135; 526/160; 526/943
(58) Field of Search ................ 502/119, 128, 502/129; 526/135

(56) References Cited

U.S. PATENT DOCUMENTS

| | | | |
|---|---|---|---|
| 4,468,477 A | * | 8/1984 | Caunt et al. ............ 502/129 |
| 4,578,373 A | * | 3/1986 | Graves ................ 502/128 |
| 5,171,798 A | | 12/1992 | McDaniel et al. |
| 5,401,820 A | | 3/1995 | McDaniel et al. ....... 526/348.5 |
| 5,455,214 A | | 10/1995 | Furtek et al. ............ 502/109 |
| 5,543,376 A | | 8/1996 | Bermeister et al. |
| 5,612,271 A | | 3/1997 | Zandona ............... 502/117 |
| 5,703,181 A | | 12/1997 | Tashiro et al. |
| 5,705,578 A | | 1/1998 | Peifer et al. |
| 6,107,230 A | * | 8/2000 | McDaniel et al. ......... 502/129 |
| 6,165,929 A | | 12/2000 | McDaniel et al. |
| 6,239,059 B1 | | 5/2001 | Saudemont et al. |
| 6,300,271 B1 | | 10/2001 | McDaniel et al. |
| 6,355,594 B1 | * | 3/2002 | McDaniel et al. |
| 6,391,816 B1 | * | 5/2002 | McDaniel et al. ......... 502/118 |

FOREIGN PATENT DOCUMENTS

| | | | |
|---|---|---|---|
| DE | 2 119 976 | * 11/1971 | ........... 502/128 |
| EP | 0 628 574 | 12/1944 | |
| EP | 0 416 928 | 3/1991 | |

* cited by examiner

Primary Examiner—Mark L. Bell
Assistant Examiner—J. Pasterczyk
(74) Attorney, Agent, or Firm—Kilpatrick Stockton LLP

(57) ABSTRACT

This invention provides catalyst compositions that are useful for polymerizing at least one monomer to produce a polymer. This invention also provides catalyst compositions that are useful for polymerizing at least one monomer to produce a polymer, wherein said catalyst composition comprises contacting a organometal compound/organoaluminum mixture, a treated solid oxide compound, and, optionally, a second organoaluminum compound. The solid oxide has been treated with an electron-withdrawing compound, in particular a chlorine, preferably zinc chloride and carbon tetrachloride.

34 Claims, No Drawings

ORGANOMETAL CATALYST COMPOSITIONS

FIELD OF THE INVENTION

This invention is related to the field of organometal catalyst compositions.

BACKGROUND OF THE INVENTION

The production of polymers is a multi-billion dollar business. This business produces billions of pounds of polymers each year. Millions of dollars have been spent on developing technologies that can add value to this business.

One of these technologies is called metallocene catalyst technology. Metallocene catalysts have been known since about 1958. However, their low productivity did not allow them to be commercialized. About 1974, it was discovered that contacting one part water with one part trimethylaluminum to form methyl aluminoxane, and then contacting such methyl aluminoxane with a metallocene compound, formed a metallocene catalyst that had greater activity. However, it was soon realized that large amounts of expensive methyl aluminoxane were needed to form an active metallocene catalyst. This has been a significant impediment to the commercialization of metallocene catalysts.

Fluoro-organo borate compounds have been used in place of large amounts of methyl aluminoxane. However, this is not satisfactory, since such borate compounds are very sensitive to poisons and decomposition, and can also be very expensive.

It should also be noted that having a heterogeneous catalyst is important. This is because heterogeneous catalysts are required for most modern commercial polymerization processes. Furthermore, heterogeneous catalysts can lead to the formation of substantially uniform polymer particles that have a high bulk density. These types of substantially uniform particles are desirable because they improve the efficiency of polymer production and transportation. Efforts have been made to produce heterogeneous metallocene catalysts; however, these catalysts have not been entirely satisfactory.

Bridged fluorenyl zirconium metallocenes hold a special place in the development of loop-slurry polyethylene technology. Such compounds are known for their excellent ability to incorporate hexene efficiently, which is important in a loop-slurry process. They also are capable of producing very high molecular weight polymer, which is difficult for bis-cyclopentadienyl zirconium species, or even for bis-indenyl zirconium species. Some, notably [2-($\eta^5$-cyclopentadienyl)-2-($\eta^5$-fluoren-9-yl)hex-5-ene]zirconium (IV) dichloride, produce exceptionally transparent and glossy films and other manufactures. Bridged fluorenyl zirconium metallocenes are activated well enough by methyl aluminoxanes (MAO), but unfortunately MAO is expensive and in the liquid state tends to cause fouling in the reactor.

An object of this invention is to provide a process that produces a catalyst composition that can be used to polymerize at least one monomer to produce a polymer.

Another object of this invention is to provide the catalyst composition.

Another object of this invention is to provide a process comprising contacting at least one monomer and the catalyst composition under polymerization conditions to produce the polymer.

Another object of this invention is to provide an article that comprises the polymer produced with the catalyst composition of this invention.

SUMMARY OF THE INVENTION

In accordance with one embodiment of this invention, a process to produce a catalyst composition is provided. The process comprises (or optionally, "consists essentially of," or "consists of"):

1) contacting at least one organometal compound and at least one first organoaluminum compound to produce an organometal/organoalurinumn mixture;
   wherein the organometal compound has the following general formula:

$(X^1)(X^2)(X^3)(X^4)M^1$ wherein $M^1$ is selected from the group consisting of titanium, zirconium, and hafnium;
   wherein $(X^1)$ and $(X^2)$ are cyclopentadienyl derivatives and at least one is a fluorenyl or substituted fluorenyl;
   wherein cyclopentadienyl derivatives are selected from the group consisting of cyclopentadienyls, indenyls, fluorenyls, substituted cyclopentadienyls, substituted indenyls, and substituted fluorenyls;
   wherein substituents on the substituted cyclopentadienyls, substituted indenyls, and substituted fluorenyls of $(X^1)$ and $(X^2)$ are selected from the group consisting of aliphatic groups, cyclic groups, combinations of aliphatic and cyclic groups, silyl groups, alkyl halide groups, halides, organometallic groups, phosphorus groups, nitrogen groups, oxygen groups, silicon, phosphorus, boron, germanium, and hydrogen;
   wherein $(X^1)$ and $(X^2)$ are connected by a bridge having one or two atoms between $(X^1)$ and $(X^2)$; and further wherein the one or two atoms of the bridge can contain substituents;
   wherein $(X^3)$ and $(X^4)$ are independently selected from the group consisting of halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups; and
   wherein the first organoaluminum compound is selected from the group consisting of triethyl aluminum, tripropyl aluminum, and tri-n-butyl aluminum;

2) contacting the organometal/organoaluminum mixture with a treated solid oxide compound and optionally, at least one second organoaluminum compound;

wherein the second organoaluminum compound is added in a reactor, and is represented by the following formula:

$$Al(X^5)_n(X^6)_{3-n}$$

wherein $(X^5)$ is a hydrocarbyl having from 1 to about 20 carbon atoms;
wherein $(X^6)$ is a halide, hydride, or alkoxide; and
wherein "n" is a number from 1 to 3 inclusive; and;
wherein the treated solid oxide compound is produced by a process comprising: a) contacting at least one solid oxide compound with at least one electron-withdrawing anion source compound; b) optionally, also contacting the solid oxide compound with at least one metal salt compound; and c) calcining the solid oxide compound before, during, or after contacting the electron-withdrawing anion source compound or metal salt compound to produce the treated solid oxide compound.

In accordance with a second embodiment of this invention, a process is provided comprising contacting at least one monomer and the catalyst composition under polymerization conditions to produce a polymer.

In accordance with a third embodiment of this invention, an article is provided. The article comprises the polymer produced in accordance with this invention.

These objects, and other objects, will become more apparent to those with ordinary skill in the art after reading this disclosure.

DETAILED DESCRIPTION OF THE INVENTION

A process to produce a catalyst composition is provided. The process comprises contacting at least one organometal compound and at least one first organoaluminum compound to produce an organometal/organoaluminum mixture. Then, contacting the organometal/organoaluminum mixture with a treated solid oxide compound and optionally, at least one second organoaluminum compound to produce the catalyst composition.

The organometal compound utilized in this invention has the following general formula:

$$(X^1)(X^2)(X^3)(X^4)M^1$$

$M^1$ is selected from the group consisting of titanium, zirconium, and hafnium. Preferably, $M^1$ is zirconium. $(X^1)$ and $(X^2)$ are cyclopentadienyl derivatives and at least one is a fluorenyl or substituted fluorenyl. Cyclopentadienyl derivatives are selected from the group consisting of cyclopentadienyls, indenyls, fluorenyls, substituted cyclopentadienyls, substituted indenyls, and substituted fluorenyls. Preferably, $(X^1)$ or $(X^2)$ is cyclopentadienyl.

Substituents on the substituted cyclopentadienyls, substituted indenyls, and substituted fluorenyls of $(X^1)$ and $(X^2)$ are selected from the group consisting of aliphatic groups, cyclic groups, combinations of aliphatic and cyclic groups, silyl groups, alkyl halide groups, halides, organometallic groups, phosphorus groups, nitrogen groups, oxygen groups, silicon, phosphorus, boron, germanium, and hydrogen.

Suitable examples of aliphatic groups are hydrocarbyls, such as, for example, paraffins and olefins. Suitable examples of cyclic groups are cycloparaffins, cycloolefins, cycloacetylenes, and arenes. Substituted silyl groups include, but are not limited to, alkylsilyl groups where each alkyl group contains from 1 to about 12 carbon atoms, arylsilyl groups, and arylalkylsilyl groups. Suitable alkyl halide groups have alkyl groups with 1 to about 12 carbon atoms. Suitable organometallic groups include, but are not limited to, substituted silyl derivatives, substituted tin groups, substituted germanium groups, and substituted boron groups.

Suitable examples of such substituents are methyl, ethyl, propyl, butyl, tert-butyl, isobutyl, amyl, isoamyl, hexyl, cyclohexyl, heptyl, octyl, nonyl, decyl, dodecyl, 2-ethylhexyl, pentenyl, butenyl, phenyl, chloro, bromo, iodo, trimethylsilyl, and phenyloctylsilyl.

$(X^1)$ or $(X^2)$ are connected by a bridge having one or two atoms between $(X_1)$ and $(X_2)$. The one or two atoms in the bridge can contain substituents. Preferably, the bridge has one atom connecting $(X^1)$ and $(X^2)$. The atoms of the bridge can be carbon or silicon, optionally substituted with alkyl or aryl radicals. A substituted single carbon bridge is preferred.

$(X^3)$ and $(X^4)$ are independently selected from the group consisting of halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, arido groups, substituted amido groups, phosphido groups, substituted phosphido groups, alkyloxide groups, substituted alkyloxide groups, aryloxide groups, substituted aryloxide groups, organometallic groups, and substituted organometallic groups; aryloxide groups, organometallic groups, and substituted organometallic groups.

Suitable examples of aliphatic groups are hydrocarbyls, such as, for example, paraffins and olefins. Suitable examples of cyclic groups are cycloparaffins, cycloolefins, cycloacetylenes, and arenes. Currently, it is preferred when $(X^3)$ and $(X^4)$ are selected from the group consisting of halides and hydrocarbyls, where such hydrocarbyls have from 1 to about 10 carbon atoms. However, it is most preferred when $(X^3)$ and $(X^4)$ are selected from the group consisting of fluoro, chloro, and methyl.

Suitable examples of aliphatic groups are hydrocarbyls, such as, for example, paraffins and olefins. Suitable examples of cyclic groups are cycloparaffins, cycloolefins, cycloacetylenes, and arenes. Suitable organometallic groups include, but are not limited to, substituted silyl derivatives, substituted tin groups, substituted germanium groups, and substituted boron groups.

Various processes are known to make these organometal compounds. See, for example, U.S. Pat. Nos. 4,939,217; 5,210,352; 5,436,305; 5,401,817; 5,631,335, 5,571,880; 5,191,132; 5,480,848; 5,399,636; 5,565,592; 5,347,026; 5,594,078; 5,498,581; 5,496,781; 5,563,284; 5,554,795; 5,420,320; 5,451,649; 5,541,272; 5,705,478; 5,631,203; 5,654,454; 5,705,579; and 5,668,230; the entire disclosures of which are hereby incorporated by reference.

Bridged fluorenyl zirconium structures of utility in this invention as organometal compounds include 1,2-ethanediylbis(9-fluorenyl)zirconium dichloride; (organometal A), diphenylmethanediyl(9-fluorenyl, cyclopentadienyl)zirconium dichloride (organometal B), and phenylmethylmethanediyl(9-fluorenyl, cyclopentadienyl)zirconium dichloride (organometal C), [2-($\eta^5$-cyclopentadienyl)-2-($\eta^5$-fluoren-9-yl)hex-5-ene] zirconium(IV) dichloride (organometal D). These structures are shown below.

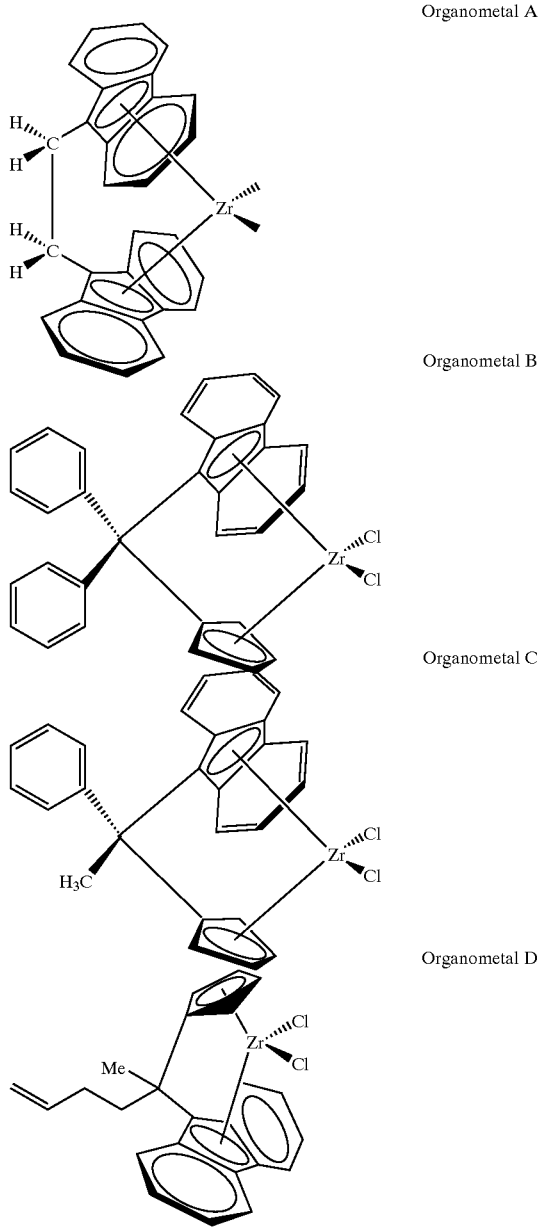

Preferably, the organometal compound is organometal D.

The first organoaluminum compound is selected from the group consisting of triethyl aluminum (TEA), tripropyl aluminum, and tri-n-butyl aluminum. Preferably, the first organoaluminum compound is TEA.

Optionally, at least one second organoaluminum compound also can be added to a reactor directly as a cocatalyst. The second organoaluminum compound has the following general formula:

$$Al(X^5)_n(X^6)_{3-n}$$

In this formula, ($X^5$) is a hydrocarbyl having from 1 to about 20 carbon atoms. Currently, it is preferred when ($X^5$) is a linear alkyl having from 1 to about 10 carbon atoms. However, it is most preferred when ($X^5$) is selected from the group consisting of ethyl, propyl, and butyl.

In this formula, ($X^6$) is a halide, hydride, or alkoxide. Currently, it is preferred when ($X^6$) is independently selected from the group consisting of fluoro and chloro. However, it is most preferred when ($X^6$) is chloro.

In this formula, "n" is a number from 1 to 3 inclusive. However, it is preferred when "n" is 3.

Examples of such compounds are as follows:

trimethyl aluminum;
triethyl aluminum (TEA);
tripropyl aluminum;
diethylaluminum ethoxide;
tributylaluminum;
diisobutylaluminum hydride;
triisobutylaluminum hydride;
triisobutylaluminum; and
diethylaluminum chloride.

Currently, TEA is preferred.

Treated solid oxide compounds are compounds that have had their Lewis acidity increased. The treated solid oxide compound can be produced by a process comprising contacting at least one solid oxide compound with at least one electron-withdrawing anion source to form an anion-containing solid oxide compound. The solid oxide compound is calcined either prior to, during, or after contacting with the electron-withdrawing anion source. Calcining is discussed later in this disclosure.

Generally, the specific surface area of the solid oxide compound after calcining at 500° C. is from about 100 to about 1000 m$^2$/g, preferably, from about 200 to about 800 m$^2$/g, and most preferably, from 250 to 600 m$^2$/g.

The specific pore volume of the solid oxide compound is typically greater than about 0.5 cc/g, preferably, greater than about 0.8 cc/g, and most preferably, greater than 1.0 cc/g.

It is preferred when the treated solid oxide compound comprises oxygen and at least one element selected from the group consisting of groups 2–17 of the Periodic Table of Elements, including lanthanides and actinides. However, it is preferred when the element is selected from the group consisting of Al, B, Be, Bi, Cd, Co, Cr, Cu. Fe, Ga, La, Mn, Mo, Ni, Sb, Si, Sn, Sr, Th, Ti, V, W, P, Y, Zn, and Zr. It is important that these treated solid oxide compounds have electron withdrawing ability, while not wanting to be bound by theory, it is believed that a treated solid oxide compound should have a higher Lewis acidity compared to the untreated solid oxide compound. However, it is hard to accurately measure the Lewis acidity of these treated, and untreated solid oxide compounds so various methods have been used. Currently, comparing the activities of treated and untreated solid oxide compounds under acid catalyzed reactions is preferred.

Treated solid oxide compounds can be produced in a variety of ways, such as, for example, by gelling, co-gelling, or impregnation of one compound onto another.

In general, it is preferred to contact at least one solid oxide compound, such as, for example, alumina, zirconia, titania, and mixtures thereof, such as, for example, silica-alumina, with at least one electron-withdrawing anion source compound, to form an anion-containing solid oxide compound, followed by calcining the anion-containing solid oxide compound to form a treated solid oxide compound. In the alternative, a solid oxide compound and an electron-withdrawing anion source compound can be contacted and calcined simultaneously.

The electron-withdrawing anion source compound is any compound that increases the Lewis acidity of the solid oxide under the conditions given herein for producing the treated solid oxide compound. These electron-withdrawing anion source compounds increase the Lewis acidity of the solid oxide compound by contributing to the formation of an electron withdrawing anion, such as, for example, sulfates, halides, and triflates. It should be noted that one or more different electron withdrawing anion source compounds can be used.

The acidity of the solid oxide compound can be further enhanced by using two, or more, electron-withdrawing anion source compounds in two, or more, separate contacting steps. An example of such a process is contacting at least one solid oxide compound with a first electron-withdrawing anion source compound to form a first anion-containing solid oxide compound, followed by calcining the first anion-containing solid oxide compound, followed by contacting with a second electron-withdrawing anion source compound to form a second anion-containing solid oxide compound, followed by calcining the second anion-containing solid oxide compound to form a treated solid oxide compound. It should be noted that the first and second electron-withdrawing anion source compounds can be the same, but are preferably different.

Suitable examples of solid oxide compounds include, but are not limited to, $Al_2O_3$, $B_2O_3$, $BeO$, $Bi_2O_3$, $CdO$, $Co_3O_4$, $Cr_2O_3$, $CuO$, $Fe_2O_3$, $Ga_2O_3$, $La_2O_3$, $Mn_2O_3$, $MoO_3$, $NiO$, $P_2O_5$, $Sb_2O_5$, $SiO_2$, $SnO_2$, $SrO$, $ThO_2$, $TiO_2$, $V_2O_5$, $WO_3$, $Y_2O_3$, $ZnO$, $ZrO_2$: and mixtures thereof, such as, for example, silica-alumina and silica-zirconia. It should be noted that solid oxide compounds that comprise Al-O bonds are currently preferred.

Before, during or after calcining, the solid oxide compound can be contacted with an electron-withdrawing anion source compound. The electron-withdrawing anion source compound can be selected from the group consisting of at least one halogen-containing compound, sulfate-containing compound, or triflate-containing compound. The halogen-containing compound is selected from the group consisting of chlorine-containing compounds, bromine-containing compounds, and fluorine-containing compounds. The halogen-containing compound can be in a liquid phase, or preferably, a vapor phase. Optionally, the solid oxide compound can be calcined at 100 to 900° C. before being contacted with the halogen-containing compound.

Any method known in the art of contacting the solid oxide compound with the fluorine-containing compound can be used in this invention. A common method is to impregnate the solid oxide compound with an aqueous solution of a fluoride-containing salt before calcining, such as ammonium fluoride $[NH_4F]$, ammonium bifluoride $[NH_4HF_2]$, hydrofluoric acid $[HF]$, ammonium silicofluoride $[(NH_4)_2SiF_6]$, ammonium fluoroborate $[NH_4BF_4]$, ammonium fluorophosphate $[NH_4PF_6]$, and mixtures thereof.

In a second method, the fluorine-containing compound can be dissolved into an organic compound, such as an alcohol, and added to the solid oxide compound to minimize shrinkage of pores during drying. Drying can be accomplished by an method known in the art, such as, for example, vacuum drying, spray drying, flashing drying, and the like.

In a third method, the fluorine-containing compound can be added during the calcining step. In this technique, the fluorine-containing compound is vaporized into the gas stream used to fluidize the solid oxide compound so that it is fluorided from the gas phase. In addition to some of the fluorine-containing compounds described previously, volatile organic fluorides can be used at temperatures above their decomposition points, or at temperatures high enough to cause reaction. For example, perfluorohexane, perfluorobenzene, trifluoroacetic acid, trifluoroacetic anhydride, hexafluoroacetylacetonate, and mixtures thereof can be vaporized and contacted with the solid oxide compound at about 300 to about 600° C. in air or nitrogen. Inorganic fluorine-containing compounds can also be used, such as hydrogen fluoride or even elemental fluorine.

Generally, the amount of fluorine present is about 2 to about 50 weight percent fluorine based on the weight of the treated solid oxide compound before calcining or the amount added to a precalcined solid oxide compound. Preferably, it is about 3 to about 25 weight percent, and most preferably, it is 4 to 20 weight percent fluorine based on the weight of the treated solid oxide compound before calcining or the amount added to a precalcined solid oxide compound.

Any method known in the art of contacting the solid oxide compound with the chlorine-containing compound or bromine-containing compound can be used in this invention. Generally, the contacting is conducted during or after calcining, preferably during calcining. Any suitable chlorine-containing compound or bromine-containing compound that can deposit chlorine or bromine or both on the solid oxide compound can be used. Suitable chlorine-containing compounds and bromine-containing compound include volatile or liquid organic chloride or bromide compounds and inorganic chloride or bromide compounds. Organic chloride or bromide compounds can be selected from the group consisting of carbon tetrachloride, chloroform, dichloroethane, hexachlorobenzene, trichloroacetic acid, bromoform, dibromomethane, perbromopropane, phosgene, and mixtures thereof Inorganic chloride or bromide compounds can be selected from the group consisting of gaseous hydrogen chloride, silicon tetrachloride, tin tetrachloride, titanium tetrachloride, aluminum trichloride, boron trichloride, thionyl chloride, sulfuryl chloride, hydrogen bromide, boron tribromide, silicon tetrabromide, and mixtures thereof Additionally, chlorine and bromine gas can be used.

If an inorganic chlorine-containing compound or bromine-containing compound is used, such as titanium tetrachloride, aluminum trichloride, or boron trichioride, it also can be possible to contact the chlorine-containing compound or bromine-containing compound with the solid oxide compound after calcining, either by vapor phase deposition or even by using an anhydrous solvent.

Generally, the amount of chlorine or bromine used is from about 0.01 to about 10 times the weight of the treated solid oxide compound before calcining or the amount added to a precalcined solid oxide compound, preferably it is from about 0.05 to about 5 times, most preferably from 0.05 to 1 times the weight of the treated solid oxide compound before calcining or the amount added to a precalcined solid oxide compound.

In another embodiment of this invention, the treated solid oxide compound can be produced by a process comprising contacting at least one solid oxide compound with at least one electron-withdrawing anion source and at least one metal salt compound. In general, it is preferred to contact at least one solid oxide compound, such as, for example, alumina, zirconia, titania, and mixtures thereof, or with mixtures of other solid oxide compounds such as, for example, silica-alumina, with at least one metal salt compound and at least one electron-withdrawing anion source compound, to form an anion- and metal-containing solid oxide compound, followed by calcining the anion- and metal-containing solid oxide compound to form a treated solid oxide compound. In the alternative, a solid oxide compound, a metal salt compound, and an electron-withdrawing anion source compound can be contacted and calcined simultaneously. In another alternative, the metal salt compound and the electron-withdrawing anion source compound can be the same compound.

The metal salt compound is any compound that increases the Lewis acidity of the solid oxide compound under the conditions given herein for producing the treated solid oxide compound. It is preferred when the metal in the metal salt is selected from the group consisting of groups IIA-VIIIA and IB-VIIB of the Periodic Table of Elements, including lanthanides and actinides. However, it is preferred when the element is selected from the group consisting of Al, B, Be, Bi, Cd, Co, Cr, Cu, Fe, Ga, La, Mn, Mo, Ni, Sb, Si, Sn, Sr, Th, Ti, V, W, P, Y, Zn and Zr.

To produce the treated solid oxide compound, at least one metal salt compound can be contacted with the solid oxide compound by any means known in the art to produce a metal-containing solid oxide compound. The metal salt compound can be added to the solid oxide compound before calcining, during calcining, or in a separate step after calcining the solid oxide compound.

Generally, the solid oxide compound is contacted with an aqueous or organic solution of the metal salt compound before calcining. For example, the metal can be added to the solid oxide compound by forming a slurry of the solid oxide compound in a solution of the metal salt compound and a suitable solvent such as alcohol or water. Particularly suitable are one to three carbon atom alcohols because of their volatility and low surface tension. A suitable amount of the solution is utilized to provide the desired concentration of metal after drying. Any water soluble or organic soluble metal salt compound is suitable that can impregnate the solid oxide compound with metal. For example, the drying can be completed by suction filtration followed by evaporation, vacuum drying, spray drying, or flash drying.

If the metal is added to the solid oxide compound after calcination, one preferred method is to impregnate the solid oxide compound with a hydrocarbon solution of the metal salt compound.

Generally, the amount of metal present in the metal-containing solid oxide compound is in a range of about 0.1 to about 30 weight percent metal where the weight percent is based on the weight of the metal-containing solid oxide compound before calcining or the amount added to a precalcined solid oxide compound. Preferably, the amount of metal present in the metal-containing solid oxide compound is in a range of about 0.5 to about 20 weight percent metal based on the weight of the metal-containing solid oxide compound before calcining or the amount added to a precalcined solid oxide compound. Most preferably, the amount of metal present in the metal-containing solid oxide compound is in a range of 1 to 10 weight percent metal based on the weight of the metal-containing solid oxide compound before calcining or the amount added to a precalcined solid oxide compound.

The metal-containing solid oxide compound can then be contacted with at least one electron-withdrawing anion source compounds by the methods discussed previously in this disclosure.

Before, during, or after the solid oxide compound is combined with the metal salt compound or the electron-withdrawing anion source compound to produce the metal-containing solid oxide compound, it is calcined for about 1 minute to about 100 hours, preferably from about 1 hour to about 50 hours, and most preferably, from 3 to 20 hours. Generally, the calcining is conducted at a temperature in a range of about 200° C. to about 900° C., preferably from about 300° C. to about 700° C., and most preferably, from 350° C. to 600° C. The calcining can be conducted in any suitable atmosphere. Generally, the calcining can be completed in an inert atmosphere. Alternatively, the calcining can be completed in an oxidizing atmosphere, such as, oxygen or air, or a reducing atmosphere, such as, hydrogen or carbon monoxide.

In order to obtain high activity from the organometal compounds discussed previously, it is necessary to first contact the organometal compound and the first organoaluminum compound to produce an organometal/organoaluminum mixture. Then, the organometal/organoaluminum mixture is injected into a reactor along with the treated solid oxide compound and optionally, the second organoaluminum compound can be added as a cocatalyst. The concentration of the first organoaluminum compound in the organometal/organoaluminum mixture ranges from about 0.1 to about 10 molar, preferably from about 0.3 to about 5 molar, most preferably from 0.5 to 2.5 molar. The concentration of the organometal compound in the organometal/organoaluminum mixture ranges from about 0.001 and about 1.0 molar, preferably between about 0.005 and about 0.5 molar, most preferably between 0.01 and 0.1 molar.

Another embodiment of this invention is to pretreat the catalyst composition with monomer at low temperature for a short time to obtain a small amount of polymer on the catalyst composition before the main polymerization reaction at higher temperatures. This process is called prepolymerization and can improve activity still further. Preferably, the catalyst composition is pretreated with ethylene at a temperature of less than 40° C., most preferably less than 30° C. for a period of about 1 to about 120 minutes, preferably from 10 to 70 minutes.

A weight ratio of the second organoaluminum compound to the treated solid oxide compound in the catalyst composition ranges from about 5:1 to about 1:1000, preferably, from about 3:1 to about 1:100, and most preferably, from 1:1 to 1:50.

A weight ratio of the treated solid oxide compound to the organometal compound in the catalyst composition ranges from about 10,000:1 to about 1:1, preferably, from about 1000:1 to about 10:1, and most preferably, from 250:1 to 20:1. These ratios are based on the amount of the components combined to give the catalyst composition.

After contacting, the catalyst composition comprises a post-contacted organometal compound, a post-contacted first organoaluminum compound, a post-contacted treated solid oxide compound, and, optionally, a post-contacted second organoaluminum compound. Preferably, the post-contacted treated solid oxide compound is the majority, by weight, of the catalyst composition. Often times, specific components of a catalyst are not known, therefore, for this invention, the catalyst composition is described as comprising post-contacted compounds.

A weight ratio of the post-contacted second organoaluminum compound to the post-contacted treated solid oxide compound in the catalyst composition ranges from about 5:1 to about 1:1000, preferably, from about 3:1 to about 1:100, and most preferably, from 1:1 to 1:50.

A weight ratio of the post-contacted treated solid oxide compound to the post-contacted organometal compound in the catalyst composition ranges from about 10,000:1 to about 1:1, preferably, from about 1000:1 to about 10:1, and most preferably, from 250:1 to 20:1. These ratios are based on the amount of the components combined to give the catalyst composition.

The catalyst composition of this invention has an activity greater than 100 grams of polymer per gram of treated solid oxide compound per hour, preferably greater than 500, and most preferably greater than about 1,000. This activity is measured under slurry polymerization conditions, using isobutane as the diluent and with a polymerization temperature of 90° C., and an ethylene pressure of 550 psig. The reactor should have substantially no indication of any wall scale, coating or other forms of fouling.

One of the important aspects of this invention is that no aluminoxane needs to be used in order to form the catalyst composition. Aluminoxane is an expensive compound that greatly increases polymer production costs. This also means that no water is needed to help form such aluminoxanes. This is beneficial because water can sometimes kill a polymerization process. Additionally, it should be noted that no fluoro-organo borate compounds need to be used in order to form the catalyst composition. It should be noted that organochromium compounds and $MgCl_2$ are not needed in order to form the catalyst composition. Although aluminoxane, fluoro-organo borate compounds, organochromium compounds, and $MgCl_2$ are not needed in the preferred embodiments, these compounds can be used in other embodiments of this invention.

In another embodiment of this invention, a process comprising contacting at least one monomer and the catalyst composition to produce a polymer is provided. The term "polymer" as used in this disclosure includes homopolymers and copolymers. The catalyst composition can be used to polymerize at least one monomer to produce a homopolymer or a copolymer. Usually, homopolymers are comprised of monomer residues, having 2 to about 20 carbon atoms per molecule, preferably 2 to about 10 carbon atoms per molecule. Currently, it is preferred when at least one monomer is selected from the group consisting of ethylene, propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures thereof.

When a homopolymer is desired, it is most preferred to polymerize ethylene or propylene. When a copolymer is desired, the copolymer comprises monomer residues and one or more comonomer residues, each having from about 2 to about 20 carbon atoms per molecule. Suitable comonomers include, but are not limited to, aliphatic 1-olefins having from 3 to 20 carbon atoms per molecule, such as, for example, propylene, 1-butene, 1-pentene, 4-methyl-1-pentene, 1-hexene, 1-octene, and other olefins and conjugated or nonconjugated diolefins such as 1,3-butadiene, isoprene, piperylene, 2,3-dimethyl-1,3-butadiene, 1,4-pentadiene, 1,7-hexadiene, and other such diolefins and mixtures thereof. When a copolymer is desired, it is preferred to polymerize ethylene and at least one comonomer selected from the group consisting of 1-butene, 1-pentene, 1-hexene, 1-octene, and 1-decene. The amount of comonomer introduced into a reactor zone to produce a copolymer is generally from about 0.01 to about 10 weight percent comonomer based on the total weight of the monomer and comonomer, preferably, about 0.01 to about 5, and most preferably, 0.1 to 4. Alternatively, an amount sufficient to give the above described concentrations, by weight, in the copolymer produced can be used.

Processes that can polymerize at least one monomer to produce a polymer are known in the art, such as, for example, slurry polymerization, gas phase polymerization, and solution polymerization. It is preferred to perform a slurry polymerization in a loop reaction zone. Suitable diluents used in slurry polymerization are well known in the art and include hydrocarbons which are liquid under reaction conditions. The term "diluent" as used in this disclosure does not necessarily mean an inert material; it is possible that a diluent can contribute to polymerization. Suitable hydrocarbons include, but are not limited to, cyclohexane, isobutane, n-butane, propane, n-pentane, isopentane, neopentane, and n-hexane. Furthermore, it is most preferred to use isobutane as the diluent in a slurry polymerization. Examples of such technology can be found in U.S. Pat. Nos. 4,424,341; 4,501,885; 4,613,484; 4,737,280; and 5,597,892; the entire disclosures of which are hereby incorporated by reference.

The catalyst compositions used in this process produce good quality polymer particles without substantially fouling the reactor. When the catalyst composition is to be used in a loop reactor zone under slurry polymerization conditions, it is preferred when the particle size of the solid oxide compound is in the range of about 10 to about 1000 micrometers, preferably about 25 to about 500 micrometers, and most preferably, 50 to 200 micrometers, for best control during polymerization.

In a more specific embodiment of this invention, a process is provided to produce a catalyst composition, the process comprising (optionally, "consisting essentially of," or "consisting of"):

(1) contacting [2-($\eta^5$-cyclopentadienyl)-2-($\eta^5$-fluoren-9-yl)hex-5-ene]zirconium(IV) dichloride with TEA to produce an organometal/TEA mixture;
wherein the concentration of TEA in the organometal/TEA mixture ranges from 0.5 to 2.5 molar;
wherein the concentration of organometal in the organometal/TEA mixture ranges from 0.01 to 1 molar;
(2) combining a chlorided, zinc-containing alumina and the organometal/TEA mixture to produce the catalyst composition;
wherein the chlorided, zinc-containing alumina is produced by a process comprising contacting alumina with an aqueous solution of zinc chloride to produce a zinc-containing alumina, calcining said zinc-containing alumina at about 600° C. for three hours to produce a calcined zinc-containing alumina, and while calcining, contacting the zinc-containing alumina with carbon tetrachloride to produce the chlorided, zinc-containing alumina.

Hydrogen can be used with this invention in a polymerization process to control polymer molecular weight.

After the polymers are produced, they can be formed into various articles, such as, for example, household containers and utensils, film products, drums, fuel tanks, pipes, geomembranes, and liners. Various processes can form these articles. Usually, additives and modifiers are added to the polymer in order to provide desired effects. It is believed that by using the invention described herein, articles can be produced at a lower cost, while maintaining most, if not all, of the unique properties of polymers produced with metallocene catalysts.

EXAMPLES

Testing Methods

Melt index (MI, g/10 min) was determined in accordance with ASTM D1238 at 190° C. with a 2,160 gram weight.

High load melt index (HLMI, g/10 min) was determined in accordance with ASTM D1238 at 190° C. with a 21,600 gram weight.

Polymer density was determined in grams per cubic centimeter (g/cc) on a compression molded sample, cooled at about 15° C. per hour, and conditioned for about 40 hours at room temperature in accordance with ASTM D1505 and ASTM D1928, procedure C.

Molecular weights and molecular weight distributions were obtained using a Waters 150 CV gel permeation chromatograph with trichlorobenzene (TCB) as the solvent, with a flow rate of 1 milliliter/minute at a temperature of 140° C. 2,6-di-tert-butyl-4-methylphenol (BHT) at a concentration of 1.0 gram per liter was used as a stabilizer in the TCB. An injection volume of 220 liters was used with a nominal polymer concentration of 0.3 gram/liter at room temperature. Dissolution of the sample in stabilized TCB was carried out by heating at about 160–170° C. for 20 hours with occasional, gentle agitation. The column was two Waters HT-6E columns (7.8 mm×300 mm). The columns were calibrated with a broad linear polyethylene standard (Phillips Marlex® BHB 5003) for which the molecular weight had been determined.

A "Quantachrome Autosorb-6 Nitrogen Pore Size Distribution Instrument" was used to determined specific surface area ("surface area") and specific pore volume ("pore volume"). This instrument was acquired from the Quantachrome Corporation, Syosset, N.Y.

Description of the Solid Oxide Compound Preparation

A commercial alumina sold as Ketjen grade B alumina was obtained from Akzo Nobel Chemical having a pore volume of about 1.78 cc/g and a surface area of about 350 square meters per gram.

A silica-alumina was obtained from W. R. Grace as MS 13-110 containing 13% by weight alumina and 87% by weight silica. The silica-alumina had a pore volume of about 1.2 cc/g and a surface area of about 450 square meters per gram.

To calcine these solid oxide compounds, about 10 grams were placed in a 1.75 inch quartz tube fitted with a sintered quartz disk at the bottom. While the solid oxide compound was supported on the disk, dry air was blown up through the disk at a rate of about 1.6 to about 1.8 standard cubic feet per hour. An electric furnace around the quartz tube was then turned on, and the temperature was raised at the rate of 400° C. per hour to the indicated temperature, such as 600° C. At that temperature, the solid oxide compound was allowed to fluidize for three hours in the dry air. Afterward the solid oxide compound was collected and stored under dry nitrogen, where it was protected from the atmosphere until ready for testing. It was never allowed to experience any exposure to the atmosphere.

To prepare one of the treated solid oxide compounds used in these examples, referred to as treated solid oxide compound A, the alumina described previously was impregnated with an aqueous solution of zinc chloride. Approximately 200 milliliters of an aqueous solution containing 20 grams of zinc chloride, $ZnCl_2$, were added to 100 grams of alumina to reach the point of incipient wetness to produce a zinc-containing alumina. The zinc-containing alumina was then dried overnight under half an atmosphere of vacuum at 110° C. The zinc-containing alumina was calcined at 600° C. for three hours, then 2.3 milliliters of carbon tetrachloride were injected into the gas stream ahead of the zinc-containing alumina, where it evaporated and was carried up through the fluidizing bed to produce a chlorided, zinc-containing alumina.

Another treated solid oxide compound used in these examples, designated treated solid oxide compound B, was prepared, calcined, and chlorided by the same procedure as described previously except that the alumina was impregnated with an aqueous solution containing only 40 grams of $ZnCl_2$.

Another treated solid oxide compound used in these examples, designated treated solid oxide compound C, was prepared by calcining alumina at 600° C. for three hours, then injecting 2.3 milliliters of carbon tetrachloride into the gas stream ahead of the alumina bed, where it evaporated and was carried up through the bed to produce a chlorided alumina.

To prepare another treated solid oxide compound used in these examples, designated treated solid oxide compound D, alumina was impregnated with an aqueous solution containing 20 grams of ammonium sulfate, $(NH_4)_2SO_4$. It was then calcined at 600° C. to produce a sulfated alumina.

To prepare another treated solid oxide compound used in these examples, designated treated solid oxide compound E, silica-alumina was impregnated with an aqueous solution containing 10 grams of ammonium bifluoride, $NH_4HF_2$. It was then calcined at 450° C. to produce a fluorided silica-alumina.

Polymerization Test Procedure: Polymerization runs were made in a 2.2 liter steel reactor equipped with a marine stirrer running at 400 revolutions per minute (rpm). The reactor was surrounded by a steel jacket containing boiling methanol with a connection to a steel condenser. The boiling point of the methanol was controlled by varying nitrogen pressure applied to the condenser and jacket, which permitted precise temperature control to within half a degree Celsius, with the help of electronic control instruments.

Unless otherwise stated, the usual charging procedure was as follows. First, a small amount (0.01 to 0.10 gram normally) of the treated solid oxide compound was charged under nitrogen to a dry reactor. Next, about 5–10 milligrams of the organometal compound or organometal/organoaluminum mixture were added, followed by 0.6 liter of isobutane liquid. Then, a second organoaluminum compound was added, if used, typically 1.0 milliliter of a 1.0 molar solution of triethylaluminum (TEA) was added, followed by another 0.6 liter of isobutane liquid. Then, the reactor was heated up to the specified temperature, typically 90° C., and finally ethylene was added to the reactor to equal a fixed pressure, generally 550 psig to produce a reaction mixture. The reaction mixture was allowed to stir for usually around one hour. As ethylene was consumed, more ethylene flowed in to maintain the pressure. The activity of the catalyst composition was noted by recording the flow of ethylene into the reactor to maintain the set pressure.

After the allotted time, the ethylene flow was stopped, and the reactor slowly depressurized and opened to recover a granular polymer. In all cases, the reactor was clean with no indication of any wall scale, coating or other forms of fouling. The polymer was then removed and weighed. Activity was specified as grams of polymer produced per gram of solid oxide compound charged per hour ((g/g)/hr).

Control Examples 1–4

Polymerization runs 1–4, shown in Table 1, are comparative runs using organometal D. In the first example, 5.3 milligrams of organometal compound were added as a solid directly to the reactor along with treated solid oxide compound A. The other ingredients were added as described previously in the polymerization procedure, including 1 millimole of triethylaluminum (TEA). This is a procedure that has worked well for many simpler organometal compounds, such as bis-n-butylcyclopentadienyl zirconium dichloride. However, in example 1, no polymer was produced from organometal D.

In examples 2–4, 2.5 milliliters of a toluene solution containing 0.5 gram of organometal D per 100 milliliters were added along with the other ingredients previously discussed. This amounts to 10 milligrams of organometal compound. Although this procedure provides good activity with simpler organometal compounds, such as bis-n-butylcyclopentadienyl zirconium dichloride, this procedure provided only small activity with organometal D.

Control Examples 5–11

Expecting that organometal D is only sparingly soluble in the isobutane reaction diluent, and that this might handicap its potential activity, another procedure was employed. In example 5, 0.027 gram of treated solid oxide compound A was contacted with the toluene solution of organometal D described previously in Examples 2–4 to produce an organometal-containing treated solid oxide compound. The treated solid oxide compound immediately turned black. It was washed several times in heptane, which caused it to become a lavender color. Then, the heptane was evaporated off under nitrogen. The organometal-containing treated solid oxide compound was charged to the reactor normally along with an amount of organoaluminum compound as specified in Table 1. In run 5, 1 millimole of TEA was used as the organoaluminum compound, but no activity resulted.

The procedure was repeated in run 6 except that a dichloromethane solution of organometal D was used to impregnate treated solid oxide compound A. This time 0.18 gram of organometal D were dissolved into 10 milliliters of dichloromethane. This was added to 2.35 grams of treated solid oxide compound A, and the excess dichloromethane evaporated off under nitrogen to produce an organometal-containing treated solid oxide compound. Again, the final color of the organometal-containing treated solid oxide compound was lavender. Only minimal activity resulted. Then, the amount of TEA was varied to 0.5 millimole in run 7, and 3 millimoles in run 8. No polymer or very little polymer were produced in these runs. Then, different organoaluminum compounds were utilized, including trimethylaluminum (TMA) in run 9 and diethyl aluminum chloride (DEAC) in run 10. Again, no polymer was produced.

To determine if organometal D had been destroyed during the impregnation process of the treated solid oxide compound, or if traces of dichloromethane solvent was poisoning the polymerization reaction, 5 milliliters of 10% by weight methylaluminoxane (MAO) were utilized as an activator of the organometal compound in Run 11. This proved, as always, to be a potent combination producing an activity of 2450 grams of polymer per gram of treated solid oxide compound A per hour. This proved that the organometal compound that had been impregnated on the treated solid oxide compound was still intact.

Inventive Examples 12–14

The next polymerization runs illustrate this invention. In Run 12, 0.9 milliliter of the organometal D solution described previously (0.5 grams of organometal D in 100 milliliters of toluene) was mixed with 1 milliliter of 1 molar TEA and allowed to contact overnight at room temperature to produce an organometal/TEA mixture. The organometal/TEA mixture, treated solid oxide compound, and other ingredients were added to the reactor as discussed previously in the polymerization procedure. Twenty five milliliters of hexene were also added to the reactor to produce a copolymer. 634 grams of copolymer per gram of treated solid oxide compound A per hour were produced which is the highest activity yet obtained from organometal D in the absence of MAO It was found to have a melt index (MI) of 0.38 grams/10 minutes, a high load melt index (HLMI) of 9.59 grams/10 minutes, a HLMI/MI ratio of 25.5, and a density of 0.9291 g/cc. The copolymer was found to have a weight average molecular weight (Mw) of 112,000 g/mol, a number average molecular weight (Mn) of 34,500, and a Mw/Mn ratio of 3.3. It was found by c13 NMR to have 0.21 mole % ethyl branching (spontaneously produced) and 1.42 mole % butyl branching from the hexene. This reflects the same high hexene incorporation efficiency exhibited by organometal D activated by MAO.

In examples 13 and 14, a more concentrated organometal D/TEA mixture was prepared. To 10 milliliters of 1 molar TEA were added 0.15 gram of organometal D to produce an organometal/TEA mixture. It gradually dissolved and was allowed to stir overnight. 1 milliliter of the organometal/TEA mixture was added to the reactor along with treated solid oxide compound A. No additional TEA was added. 25 milliliters of hexene were added to the reactor in both examples 13 and 14. An activity of 2489 grams of polymer per gram of treated solid oxide compound A per hour was observed. A repeat of this procedure in run 14 produced 2458 grams of polymer per gram of treated solid oxide compound A per hour. Thus, this procedure produced an activity equivalent to that produced with MAO.

Example 13 produced a melt index of 0.7 gram/10 minutes, HLMI of 15.3 grams/10 minutes, HLMI/MI of 21.9, and density of 0.9296 cc/g. The polymer contained 0.20 mole % ethyl branches and 0.99 mole % butyl branches from the hexene, which again displays excellent hexene incorporation efficiency. Example 14 yielded a melt index of 0.29 gram/10 minutes, HLMI of 6.98 grams/10 minutes, HLMI/MI of 24.1, and a density of 0.9280 cc/g.

Control Examples 15–17

The polymerization test procedure discussed previously was attempted with two other organoaluminum ) compounds. Trimethyl aluminum (TMA) was used in example 15, and tri-isobutyl aluminum (TIBA) was used in examples 16 and 17. Examples 15–17 used 2 milliliters of an organometal/TEA mixture obtained by dissolving 0.042 gram of organometal D into 20 milliliters of 25% by weight TIBA or TMA, which was allowed to stir overnight. However, little or no activity was obtained from these compounds.

Inventive Examples 18–20

In another embodiment of this invention, catalyst compositions were given a "prepolymerization" treatment which can improve activity. Prepolymerization was previously discussed in this disclosure. In examples 18–20, the procedure of Examples 13 and 14 was used again. In examples 18 and 20, an organometal/TEA mixture was made containing 0.1370 gram of organometal D in 20 milliliters of 1 molar TEA. The organometal/TEA mixture was stirred overnight. Then, 0.5 milliliter of this mixture was charged to the reactor (3.4 mg of organometal D total). In example 19, 0.0177 gram of organometal D was dissolved in 10 milliliters of 1 molar TEA, and allowed to stir overnight to produce an organometal/TEA mixture. 2.5 milliliters of this mixture were added to the reactor. Next, a prepolymerization step was completed before the polymerization run. After the treated solid oxide compound had been added to the reactor, followed by the organometal/TEA mixture and isobutane, low pressure ethylene was applied to the reactor while at room temperature for an hour. In example 18, initially the 0 reactor was pressurized with ethylene to a pressure of 137 psig and sealed. After an hour had passed, the pressure had dropped to 131 psig, indicating a very small consumption of ethylene to make prepolymer. In example 19, only 60 psig of ethylene pressure was used over half an hour. Very little pressure drop was noticed during this time indicating little consumption of ethylene. In example 20, 60 psig of ethylene was used for just 11 minutes.

Then, in all three runs, the temperature and pressure were raised, and the polymerization reaction was allowed to continue as described previously. In three repetitions of this method in examples 18–20, activities of 2725, 2590, and 3753 grams of polymer per gram of treated solid oxide A per hour were obtained, which were actually above that obtained from MAO.

Control Examples 21–22

The procedure of examples 18–20 was repeated, including prepolymerization, except other organoaluminum compounds were utilized. In example 21, 0.0429 gram of organometal D was dissolved in 20 milliliters of 1 molar tri-isobutyl aluminum (TIBA) and stirred overnight to produce an organometal/TIBA mixture. Two milliliters of the organometal/TEA mixture were then added to the reactor. Prepolymerization occurred at 25° C. and 55 psig for 25 minutes. In example 22, 0.422 gram of organometal D were dissolved into 10 milliliters of 2 molar trimethylaluminum (TMA) and stirred overnight to produce an organometal/TMA mixture. Two milliliters of the organometal/TMA mixture were added to the reactor. Prepolymerization occurred at 99 psig for 67 minutes at 25° C. But in both cases, little or no activity was obtained.

Inventive Examples 23–24 and Control Example 25

The procedure of Examples 13 and 14 was repeated using TEA but without prepolymerization and with treated solid oxide compound D. Treated solid oxide compound D has generally given somewhat lower activities with other organometal compounds. In both examples, 0.0770 gram of organometal D was dissolved in 15 milliliters of 1 molar TEA and allowed to stir overnight to produce an organometal/TEA mixture. Then, 2.5 milliliters of this mixture were added to the reactor. These runs, examples 23 and 24, yielded 440 and 488 grams of polymer per gram of treated solid oxide compound D per hour. In example 23, 50 milliliters of hexene also were added to the reactor, while in Example 24, no hexene was added. The polymer from Example 23 was found to have a melt index of 0.52 gram/10 minutes, HLMI of 12.4 grams/10 minutes, and a HLMI/MI of 23.7. GPC analysis showed a weight average molecular weight (Mw) of 112,000 g/mol, a number average molecular weight (Mn) of 40,300, and a Mw/Mn ratio of 2.8. It was also found to contain 0.19 mole % ethyl branches and 1.13 mole % butyl branches from hexene incorporation. Polymer from example 24 had HLMI of 0.80 gram/10 minutes, Mw of 260,000 g/mol, Mn of 69,600, a Mw/Mn ratio of 3.7, and 0.18 mole % ethyl branching. Since hexene was not added to the reactor, no butyl branches were detected.

In Control Example 25, the same procedure was performed with the same treated solid oxide compound as in Examples 23 and 24, but using a different organometal compound, a simple zirconocene dichloride. 0.0167 gram of zirconocene dichloride was dissolved in 10 milliliters of 1 molar TEA E which was allowed to stir overnight to produce a zirconocene dichloride/TEA mixture. Then, 2.5 milliliters of this mixture were added to the reactor. As can be seen, this combination did not provide good activity.

Inventive Example 26

Finally, the procedure of examples 13 and 14 was again followed but with treated solid oxide compound (E). About 0.02 gram of organometal D was dissolved into 4 milliliters of 1 molar TEA and stirred overnight to produce an organometal/TEA mixture. 2.0 milliliters of this mixture were added to the reactor. An activity was obtained of 1121 grams of polymer per gram of treated solid oxide compound E per hour.

Control Example 27 and Inventive Example 28

In examples 27 and 28, organometal compound A (1,2-ethanediylbis(9-fluorenyl)zirconium dichloride) was used with treated solid oxide compound E. This was not a highly active combination, but one can still see the improvement in activity resulting from implementation of the procedures of this invention (Run 28 versus 27). In Example 27, 0.451 gram of organometal compound A in 20 milliliters of toluene was added to the reactor according to the polymerization test procedure discussed previously. In example 28, a rather dilute organometal/organoaluminum mixture was used consisting of 0.0451 gram of organometal compound A in 20 milliliters of toluene and 2 milliliters of 1 molar TEA. The activity of the catalyst composition in run 27 was 120 grams of polymer per gram of treated solid oxide compound E per hour while the activity in run 28 was 177, thus showing the improvement when the organometal compound is first contacted with organoaluminum compound.

Inventive Examples 29–32

In runs 29–32, organometal compound A was combined with treated solid oxide compound (B) to produce much higher activity. 0.0782 gram of organometal compound A was dissolved into 30 milliliters of 1 molar TEA and allowed to stir overnight at room temperature to produce a metallocene A/TEA mixture. Two milliliters of this mixture (5.2 mg of organometal compound A) were added to the reactor in example 29 and 32, while five milliliters were added in examples 30 and 31.

All of these runs had 25 milliliters of hexene added to the reactor. Both polymers 31 and 32 were analyzed and found to have extremely high molecular weight as evidenced by a zero HLMI. Incorporation of hexene in the polymer was again very efficient as evidenced by densities of 0.9301 cc/g and 0.9191 cc/g respectively, and by butyl branching of 0.74 and 0.82 mole %. No ethyl branching was detected.

Control Example 33 and Inventive Example 34

Finally, in examples 33 and 34, the same procedures as used in Examples 27 and 28 were utilized. The increase in activity can be clearly observed when the procedures of this invention are utilized. When organometal B (diphenylmethanediyl(9-fluorenyl, cyclopentadienyl) zirconium chloride) was added in a toluene solution to the reactor in Run 33, an activity of only 95 grams of polymer per gram of treated solid oxide compound A per hour was observed. However, when organometal B was combined with TEA to produce an organometal C/TEA mixture, and this mixture was added to the reactor along with the other ingredients as discussed previously in the polymerization test procedure, an activity of 2153 grams of polymer per gram of treated solid oxide compound A per hour was realized.

TABLE 1

Polymerization runs with organometal D

| Classification | Treated Solid Oxide Compound | Method of Organometal Compound Addition | Amount of Organoaluminum Compound | Prepolymer | Activity g/g/hr* |
|---|---|---|---|---|---|
| 1-Control | A | Solid | 1 mmol TEA | No | 0 |
| 2-Control | A | Toluene solution | 1 mmol TEA | No | 325 |
| 3-Control | A | Toluene solution | 1 mmol TEA | No | 164 |
| 4-Control | A | Toluene solution | 0.5 mmol TEA | No | 95 |
| 5-Control | A | Impregnated On Solid Oxide Compound | 1 mmol TEA | No | 0 |
| 6-Control | A | Impregnated On Solid Oxide Compound | 1 mmol TEA | No | 97 |
| 7-Control | A | Impregnated On Solid Oxide Compound | 0.5 mmol TEA | No | 0 |
| 8-Control | C | Impregnated On Solid Oxide Compound | 3 mmol TEA | No | 117 |
| 9-Control | A | Impregnated On Solid Oxide Compound | 1 mmol TMA | No | 0 |
| 10-Control | A | Impregnated On Solid Oxide Compound | 1 mmol DEAC | No | 0 |
| 11-Control | A | Impregnated On Solid Oxide Compound | 5 ml 10% MAO | No | 2450 |
| 12-Invention | A | Reacted with TEA | None more | No | 634 |
| 13-Invention | A | Reacted with TEA | None more | No | 2489 |
| 14-Invention | A | Reacted with TEA | None more | No | 2458 |
| 15-Control | A | Reacted with TMA | None more | No | 223 |
| 16-Control | A | Reacted with TIBA | None more | No | 0 |
| 17-Control | A | Reacted with TIBA | None more | No | 0 |
| 18-Invention | A | Reacted with TEA | 1.5 mmol TEA | Yes | 2725 |
| 19-Invention | A | Reacted with TEA | 1 mmol TEA | Yes | 2590 |
| 20-Invention | A | Reacted with TEA | 1.5 mmol TEA | Yes | 3753 |
| 21-Control | A | Reacted with TIBA | 1 mmol TEA | Yes | 0 |
| 22-Control | A | Reacted with TMA | None more | Yes | 63 |
| 23-Invention | D | Reacted with TEA | None more | No | 440 |
| 24-Invention | D | Reacted with TEA | None more | No | 488 |
| 25-Control | D | $Cp_2ZrCl_2$ in TEA | None more | No | 40 |
| 26-Invention | E | Reacted with TEA | 1 mmol TEA | No | 1121 |

*Treated Solid Oxide Compound A - chlorided, zinc-containing alumina;
*Treated Solid Oxide Compound B - chlorided, zinc-containing alumina;
*Treated Solid Oxide Compound C - chlorided alumina;
*Treated Solid Oxide Compound D - sulfated alumina;
*Treated Solid Oxide Compound E - fluorided silica alumina;

TABLE 1-continued

Polymerization runs with organometal D

| Classification | Treated Solid Oxide Compound | Method of Organometal Compound Addition | Amount of Organo-aluminum Compound | Pre-polymer | Activity g/g/hr* |
|---|---|---|---|---|---|

*TEA - triethyl aluminum
*TMA - trimethyl aluminum
*TIBA - tri-isobutyl aluminum
*DEAC - diethyl aluminum chloride
*MAO - methylaluminoxane
*Activity - (grams of polymer/gram of treated solid oxide compound)/hour

TABLE 2

Examples using other organometal compounds

| Classification | Treated Solid Oxide Compound | Organometal Compound | Method of Organometal Compound Addition | Amount of Organo-aluminum Compound | Activity g/g/hr* |
|---|---|---|---|---|---|
| 27-Control | E | A | Toluene solution | 1 mmol TEA | 120 |
| 28-Invention | E | A | Reacted with TEA | No more | 177 |
| 29-Invention | B | A | Reacted with TEA | No more | 1387 |
| 30-Invention | B | A | Reacted with TEA | No more | 1812 |
| 31-Invention | B | A | Reacted with TEA | No more | 1772 |
| 32-Invention | B | A | Reacted with TEA | No more | 2738 |
| 33-Control | A | B | Toluene solution | 1 mmol TEA | 95 |
| 34-Invention | A | B | Reacted with TEA | 1 mmol TEA | 2153 |

*Organometal A - (1,2-ethanediylbis(9-fluorenyl)zirconium dichloride)
*Organometal B - diphenylmethanediyl(9-fluorenyl, cyclopentadienyl) zirconium dichloride
*Treated Solid Oxide Compounds as defined in Table 1
*Activity - grams of polymer per gram of treated solid oxide compound per hour.

While this invention has been described in detail for the purpose of illustration, it is not intended to be limited thereby but is intended to cover all changes and modifications within the spirit and scope thereof.

That which is claimed is:

1. A process to produce a catalyst composition, said process comprising:

1) contacting at least one organometal compound and at least one organoaluminum compound to produce an organometal/organoaluminum mixture;
   wherein said organometal compound has the following general formula:

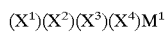
   $(X^1)(X^2)(X^3)(X^4)M^1$ wherein $M^1$ is selected from the group consisting of titanium, zirconium, and hafnium;
   wherein $(X^1)$ and $(X^2)$ are cyclopentadienyl derivatives and at least one is fluorenyl or substituted fluorenyl;
   wherein cyclopentadienyl derivatives are selected from the group consisting of cyclopentadienyls, indenyls, fluorenyls, substituted cyclopentadienyls, substituted indenyls, and substituted fluorenyls;
   wherein substituents on said substituted cyclopentadienyls, substituted indenyls, and substituted fluorenyls of $(X^1)$ and $(X^2)$ are selected from the group consisting of aliphatic groups, cyclic groups, combinations of aliphatic and cyclic groups, silyl groups, alkyl halide groups, halides, organometallic groups, phosphorus groups, nitrogen groups, boron groups, germanium groups, and hydrogen;
   wherein $(X^1)$ and $(X^2)$ are connected by a bridge having one or two atoms between $(X^1)$ and $(X^2)$; and further wherein said one or two atoms in said bridge can contain substitutents;
   wherein $(X^3)$ and $(X^4)$ are independently selected from the group consisting of halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups;
   wherein said first organoaluminum compound is selected from the group consisting of triethyl aluminum, tripropyl aluminum and tri-n-butyl aluminum;

2) contacting said organometal/organoaluminum mixture with a treated solid oxide compound and optionally, a second organoaluminum compound;
   wherein said second organoaluminum compound has the general formula:

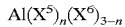
   $Al(X^5)_n(X^6)_{3-n}$ wherein $(X^5)$ is a hydrocarbyl having from 1 to about 20 carbon atoms;
   wherein $(X^6)$ is a halide, hydride, or alkoxide; and
   wherein "n" is a number from 1 to 3 inclusive; and
   wherein said treated solid oxide compound is produced by a process comprising: a) contacting at least one solid oxide compound with at least one electron-withdrawing anion source compound; b) optionally, also contacting said solid oxide compound with at least one metal salt compound; and c) calcining said solid oxide compound before, during, or after contacting with said electron-withdrawing anion source or metal salt to produce said treated solid oxide compound.

2. A process according to claim 1 wherein $(X^3)$ and $(X^4)$ are selected from the group consisting of halides and hydrocarbyls, where said hydrocarbyls have from 1 to about 10 carbon atoms.

3. A process according to claim 2 wherein $M^1$ in said organometal compound is zirconium.

4. A process according to claim 3 wherein $(X^1)$ or $(X^2)$ is cyclopentadienyl.

5. A process according to claim 4 wherein said bridge in said organometal compound is a substituted single carbon bridge.

6. A process according to claim 5 wherein $(X^3)$ and $(X^4)$ are selected from the group consisting of fluoro, chloro, and methyl.

7. A process according to claim 6 wherein said organometal compound is selected from the group consisting of [2-($\eta^5$-cyclopentadienyl)-2-($\eta^5$-fluoren-9-yl)hex-5-ene] zirconium(IV) dichloride; 1,2-ethanediylbis(9-fluorenyl) zirconium dichloride; diphenylmethanediyl(9-fluorenyl)

(cyclopentadienyl)zirconium dichloride; and phenylmethylmethanediyl(9-fluorenyl)(cyclopentadienyl) zirconium dichloride.

8. A process according to claim 7 wherein said organometal compound is [2-($\eta^5$-cyclopentadienyl)-2-($\eta^5$-fluoren-9-yl)hex-5-ene]zirconium(IV) dichloride.

9. A process according to claim 1 wherein said first organoaluminum compound is triethylaluminum.

10. A process according to claim 1 wherein said treated solid oxide compound comprises oxygen and at least one element selected from the group consisting of groups 2–17 of the Periodic Table of Elements, including lanthanides and actinides.

11. A process according to claim 10 wherein said element is selected from the group consisting of Al, B, Be, Bi, Cd, Co, Cr, Cu, Fe, Ga, La, Mn, Mo, Ni, Sb, Si, Sn, Sr, Th, Ti, V, W, P, Y, Zn and Zr.

12. A process according to claim 10 wherein said solid oxide compounds are selected from the group consisting of $Al_2O_3$, $B_2O_3$, $BeO$, $Bi_2O_3$, $CdO$, $Co_3O_4$, $Cr_2O_3$, $CuO$, $Fe_2O_3$, $Ga_2O_3$, $La_2O_3$, $Mn_2O_3$, $MoO_3$, $NiO$, $P_2O_5$, $Sb_2O_5$, $SiO_2$, $SnO_2$, $SrO$, $ThO_2$, $TiO_2$, $V_2O_5$, $WO_3$, $Y_2O_3$, $ZnO$, $ZrO_2$, and mixtures thereof.

13. A process according to claim 1 wherein the concentration of said first organoaluminum compound in said organometal/organoaluminum mixture ranges from about 0.3 to about 5 molar.

14. A process according to claim 13 wherein the concentration of said first organoaluminum compound in said organometal/organoaluminum mixture ranges from about 0.5 to 2.5 molar.

15. A process according to claim 1 wherein the concentration of organometal compound in said organometal/organoaluminum mixture ranges from about 0.005 and about 0.5 molar.

16. A process according to claim 15 wherein the concentration of organometal compound in said organometal/organoaluminum mixture ranges from 0.01 and 0.1 molar.

17. A process according to claim 1 wherein said catalyst composition is contacted with monomer in a prepolymerization step.

18. A process according to claim 17 wherein said catalyst composition is contacted with ethylene at a temperature of less than 40° C. and for a period of about 1 to 120 minutes.

19. A process to produce a catalyst composition, said process comprising:
1) contacting [2-($\eta^5$-cyclopentadienyl)-2-($\eta^5$-fluoren-9-yl)hex-5-ene]zirconium(IV) dichloride with triethyl aluminum to produce an organometal/triethyl aluminum mixture;
    wherein the concentration of triethyl aluminum in said organometal/triethyl aluminum mixture ranges from 0.5 to 2.5 molar;
    wherein the concentration of organometal in said organometal/triethyl aluminum mixture ranges from 0.01 to 1 molar;
2) combining a chlorided, zinc-containing alumina and said organometal/triethyl aluminum mixture to produce said catalyst composition;
    wherein said chlorided, zinc-containing alumina is produced by a process comprising contacting alumina with an aqueous solution of zinc chloride to produce a zinc-containing alumina, calcining said zinc-containing alumina at about 600° C. for three hours to produce a calcined zinc-containing alumina, and while calcining, contacting said zinc-containing alumina with carbon tetrachloride to produce said chlorided, zinc-containing alumina.

20. A catalyst composition produced by the process of claim 1.

21. A catalyst composition according to claim 20 wherein said catalyst composition has an activity greater than 500 grams of polymer per gram of treated solid oxide compound per hour under slurry polymerization conditions, using isobutene as a diluent, with a polymerization temperature of 90° C., and an ethylene pressure of 550 psig.

22. A catalyst composition according to claim 21 wherein said catalyst composition has an activity greater than 1000 grams of polymer per gram of treated solid oxide compound per hour under slurry polymerization conditions, using isobutene as a diluent, with a polymerization temperature of 90° C., and an ethylene pressure of 550 psig.

23. A catalyst composition according to claim 22 wherein a weight ratio of said second organoaluminum compound to said treated solid oxide compound in said catalyst composition ranges from about 3:1 to about 1:100.

24. A catalyst composition according to claim 23 wherein said weight ratio of said second organoaluminum compound to said treated solid oxide compound in said catalyst composition ranges from 1:1 to 1:50.

25. A catalyst composition according to claim 24 wherein a weight ratio of said treated solid oxide compound to said organometal compound in said catalyst composition ranges from about 1000:1 to about 10:1.

26. A catalyst composition according to claim 25 wherein said weight ratio of said treated solid oxide compound to said organometal compound in said catalyst composition ranges from 250:1 to 20:1.

27. A catalyst composition according to claim 20 wherein said composition subsequent to contacting said organometal compound/organoaluminum compound, treated solid oxide compound, and second organoaluminum compound consists essentially of organometal compound and treated solid oxide compound.

28. A catalyst composition according to claim 27 wherein said composition subsequent to contacting said organometal compound/organoaluminum compound, treated solid oxide compound, and second organoaluminum compound consists essentially of organometal compound, second organoaluminum compound and treated solid oxide compound.

29. A polymerization process comprising contacting at least one monomer and said catalyst composition of claim 20 under polymerization conditions to produce a polymer.

30. A process according to claim 29 wherein said polymerization conditions comprise slurry polymerization conditions.

31. A process according to claim 30 wherein said contacting is conducted in a loop reaction zone.

32. A process according to claim 31 wherein said contacting is conducted in the presence of a diluent that comprises isobutane.

33. A process according to claim 29 wherein said at least one monomer is ethylene.

34. A process according to claim 29 wherein said at least one monomer comprises ethylene and an aliphatic 1-olefin having 3 to 20 carbon atoms per molecule.

* * * * *